March 13, 1934. J. R. OISHEI ET AL Re. 19,113

WINDSHIELD CLEANER

Original Filed March 11, 1925 2 Sheets-Sheet 1

Inventors
John R. Oishei
Henry Hueber
William Paulus
Erwin C. Horton

By Bean & Brooks. Attorneys

March 13, 1934. J. R. OISHEI ET AL Re. 19,113

WINDSHIELD CLEANER

Original Filed March 11, 1925 2 Sheets-Sheet 2

Inventors
John R. Oishei
Henry Hueber
William Paulus
Erwin C. Horton

By Bean & Brooks. Attorneys

Reissued Mar. 13, 1934

Re. 19,113

UNITED STATES PATENT OFFICE 19,113

WINDSHIELD CLEANER

John R. Oishei, Henry Hueber, and William Paulus, Buffalo, and Erwin C. Horton, Hamburg, N. Y., assignors to Trico Products Corporation, Buffalo, N. Y.

Original No. 1,783,582, dated December 2, 1930, Serial No. 14,755, March 11, 1925. Application for reissue November 28, 1932, Serial No. 644,722

11 Claims. (Cl. 15—255)

This invention relates to windshield cleaners, and more particularly to the construction or assembly of the wiper carrying arms of such devices.

There are in use certain types of windshields for automobiles which comprise a single windshield glass panel pivoted or hinged along the upper edge to the header bar of the front frame of the vehicle. It is desirable in constructions of this kind to mount the windshield cleaner on the header bar of the vehicle frame but the use of a windshield cleaner having an integral, resilient or spring wiper carrying arm is impracticable owing to the swinging of the windshield glass.

The objects of this invention are to provide a windshield cleaner having a wiper carrying arm which will resiliently bear upon the glass with proper pressure at any desired inclination of the windshield glass or of the wiper carrying arm to its operating shaft. A further object is to provide a novel method of mounting or assembling an improved connection between the wiper carrying arm of a windshield cleaner and its operating shaft so as to facilitate installation of the cleaner on a car, and also to provide a connector for a wiper carrying arm which may be supplied at relatively small cost and may be readily replaced. A still further object is to provide a readily detachable squeegee holder which may easily be attached to the operating shaft without the use of tools or without any clamping pressure brought thereon.

Figure 1:
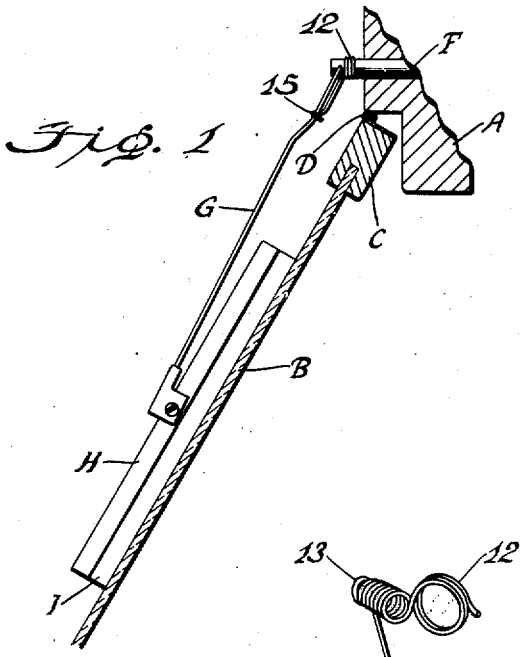
Fig. 1 is a sectional elevation of a portion of a windshield and of a wiper embodying the invention, showing the windshield glass in partly open position.
Figure 2:
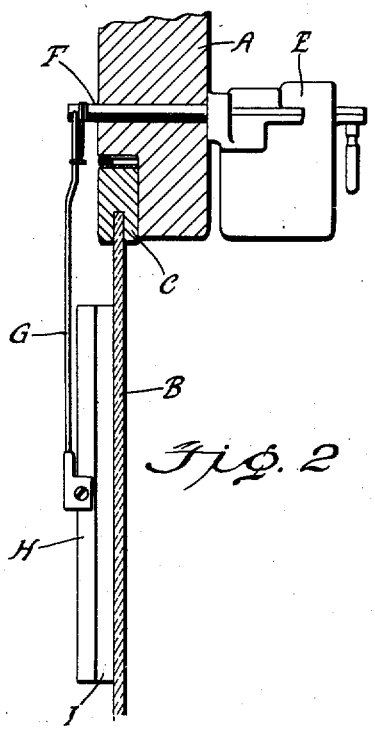
Fig. 2 is a sectional elevation of a portion of a windshield and of a wiper embodying the invention showing the windshield glass in closed position.
Figure 3:
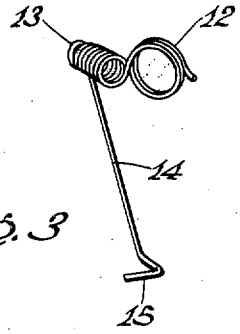
Fig. 3 is a perspective view of the spring connector for the wiper carrying arm.
Figure 4:
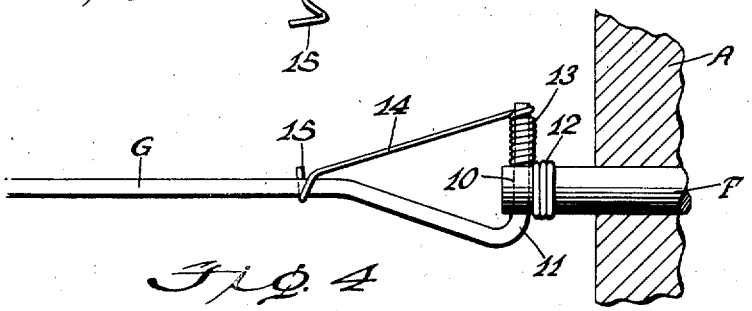
Fig. 4 is a plan view of a portion of the windshield wiper showing a part of the header bar of the vehicle frame in section.

In Figs. 1 to 4 of the drawings, A designates a front header bar or other fixed part of a motor vehicle frame or of a windshield frame. There is hinged to this header bar a windshield glass section B mounted in a frame, of which a portion C is shown, which upper frame portion is hinged to the header bar, as at D. As shown in Fig. 2, when the windshield is closed, the glass section is normally in substantially vertical position and when the windshield glass is open it swings outwardly, as indicated in Fig. 1. It has been found that in such construction of windshield, the cleaners which employ a resilient wiper carrying arm consisting, for example, of spring strip material, are undesirable as when the windshield glass is open the wiper is forced against the glass with an undue pressure, resulting in disastrous distortions of the rubber wiper strip or too great a strain upon the bearing for the rock shaft which swings the wiper.

There is illustrated a cleaner of the automatic type having an atmospheric air motor E which oscillates a rock shaft F. In the form illustrated, the motor E is mounted on the inner side of the header bar and an extension of the rock shaft F extends through the header bar to the outside of the windshield. Any suitable type of actuating means for the wiper strip or for the rock shaft F may be employed. In the embodiment shown, the rock shaft F swings a rod or wiper-carrying arm G which has connected to it a wiper strip H having a suitable wiper element I of rubber or other desired composition.

In order to permit substantially free swinging or opening of the windshield glass, and at the same time maintain proper pressure of the wiper strip upon the glass, the wiper carrying rod is provided at its connection with the rock shaft or other actuating member with means operating to urge the wiper strip resiliently against the windshield glass. This means is preferably in the form of a coil spring and in addition to urging the wiper strip against the glass, preferably forms a detachable connection between the wiper carrying arm and its actuating member. In the embodiment shown, the actuating member or rock shaft is provided with a recess or hole 10 adapted to receive a part of the wiper carrying arm and the wiper carrying arm is bent at its upper end to provide a part 11 which extends through the hole 10 in the rock shaft so that the wiper carrying arm will swing in unison with the rock shaft. The connector or spring device preferably embodies means for detachably holding the wiper carrying rod in connection with the rock shaft to swing therewith, and means for exerting spring pressure upon the wiper carrying rod, and in the embodiment shown, this is accomplished by providing the spring member with a shaft engaging portion 12 which engages the rock shaft and a rod engaging portion 13 through which a portion of the wiper carrying rod preferably extends. The connector is further provided with an extension or leg portion 14 which engages the wiper carrying rod at another point in order to exert the pressure of the spring thereon and maintain the device connected. As illustrated, this leg 14 may be provided with a substantially hooked end 15 which slidably engages the wiper carrying rod.

The device is readily assembled by shoving the shaft engaging portion 12 onto the shaft to surround a portion of the shaft and by inserting the bent end 11 of the wiper carrying rod in the hole 10 in the shaft and through the rod engaging portion 13 of the spring member. The leg 14 is then hooked into the wiper carrying rod, the wiper carrying rod being thus detachably and resiliently connected to the rock shaft or actuating member. Reverse operations to those specified result in a ready removal of the wiper carrying rod. The spring connector may be produced at a very small cost and the spring connectors may be replaced as desired in order to provide for proper spring pressure on the wiper strip at all times.

Figure 5:
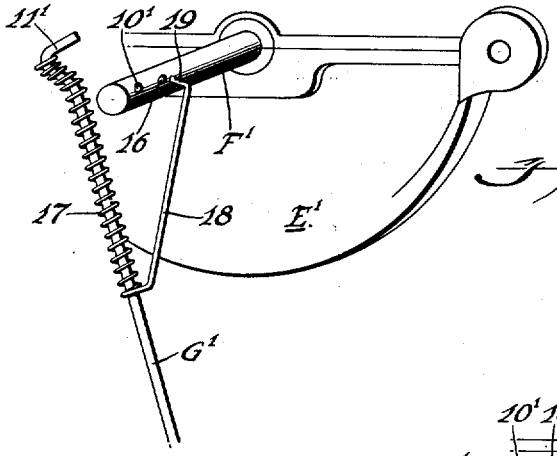
Fig. 5 is an elevation of a portion of a windshield cleaner showing a modified form of the invention, the wiper carrying arm being detached from its operating shaft.
Figure 6:
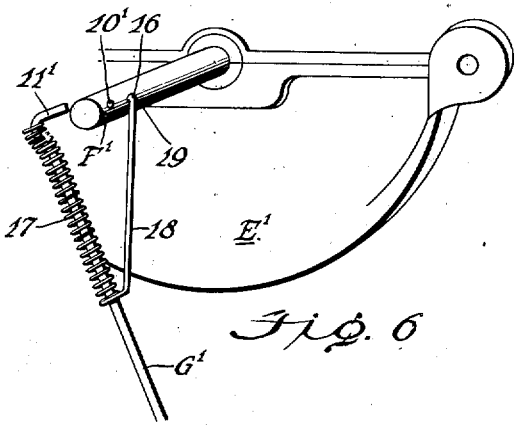
Figs. 6 and 7 are elevations of portions of windshield cleaners embodying the invention, illustrating the method of attaching the wiper carrying arm of the modified form shown in Fig. 5.
Figure 7:
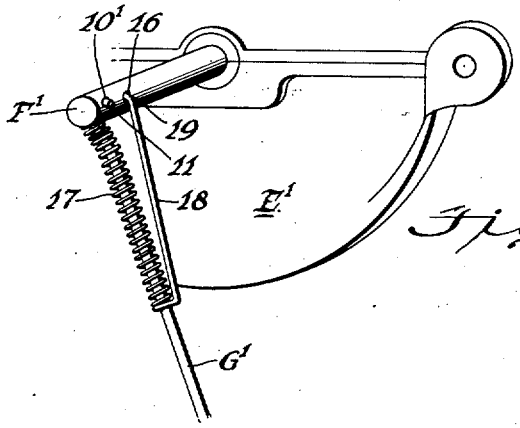

In the form shown in Figs. 5 to 7, E′ designates the motor with its rock shaft F′ and G′ designates the wiper carrying arm. The rock shaft F′ is provided with a hole or opening 10′ to receive the part or end 11′ of the wiper carrying arm. The shaft is further preferably provided with a hole or opening 16 spaced from the hole or opening 10′. 17 designates the spring pressure member and detachable connector. This spring device is preferably mounted on the upper end of the wiper carrying arm so that the lower end of the spring may have sliding engagement with the wiper carrying arm. The spring is also provided with a tensioning member or part adapted to bear on the shaft a distance from the pivotal connection of the wiper carrying arm with the shaft. In the embodiment shown, this is in the form of a leg 18 having a bent end portion 19 which is adapted to extend through the hole or opening 16 in the shaft. This connection detachably secures the wiper carrying rod to the shaft and as the wiper carrying rod is swung relatively to the shaft the leg 18 compresses the spring 17, thereby resiliently pressing on the wiper carrying arm below its pivot and resiliently pressing the wiper carrying arm toward the windshield glass.

Figs. 5 to 7 illustrate the method of mounting the form of spring pressure member shown therein. As indicated in Fig. 6, to connect the wiper carrying rod to the shaft, the end 19 of the part 18 is inserted in the hole or opening 16. The end 11′ of the wiper carrying rod is then inserted in the hole or opening 10′, as shown in Fig. 7, which operation connects the parts. Reverse operations disconnect the wiper carrying arm from its operating shaft.

Figure 8:
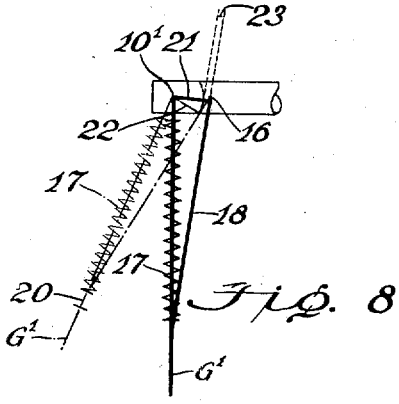
Fig. 8 is a diagrammatic showing illustrating the compensating action by which the pressure of the wiper blade on the windshield glass is maintained substantially uniform for different angular positions of the latter.

Should the windshield be moved to an open position, the arm G′ will move forwardly therewith, such as from the full line position to the dotted position in Fig. 8, swinging about the axis 10′. At the same time the part 18 moves about the fulcrum end or axis 19. Since the two elements G′ and 18 move about different pivots it will be obvious that the lower end of part 18 will ride along the arm G′ a distance, such as indicated at 20. The spring 17 will therefore be compressed the extent indicated at 20 so that the spring tension will be increased.

However, during this increased tensioning of the spring the effective leverage is also varied to compensate for such increased tension. The line of spring force being substantially coincident with the arm G′ and exerting a downward pull on the diagonal part 18 in Fig. 8, the leverage may then be designated by the line 21 which is dropped from the fulcrum 10′ perpendicularly to the line of spring force. This perpendicular distance decreases as the blade carrying arm G′ is moved from the full line position to the dotted line position of Fig. 8 and therefore when the parts are in the dotted line position the leverage (indicated by the line 22) will be shorter than the leverage 21. Consequently, since the spring tension increases as the leverage shortens the resultant spring pressure in the wiping contact of the blade on the glass will be maintained substantially uniform. Thus, with the arrangement depicted in Figs. 5, 6 and 7, the wiper blade will be operated on the windshield glass under substantially the same uniform wiping pressure, whether the glass is at right angles to the oscillating shaft F′ or inclining forwardly therefrom.

It will be noted that this mounting of the wiper moving arm permits the wiper moving arm to swing from a position in which it is at an acute angle to the axis of the operating shaft or member to a position wherein it is co-planar with the axis of the wiper moving shaft or member, if desired, or to any intermediate position. If the wiper moving arm is swung from the acute angle position, the spring is compressed and spring pressure or pull is exerted upon the wiper moving arm by the connecting leg or member and the spring portion. This construction permits the windshield glass to be swung to any desired position while the wiper operating shaft remains in its original position and insures that spring pressure is always properly placed on the wiper member. It will be further noted that a simple and readily detachable squeegee holder has been provided in which the squeegee or wiper I is carried on the lower end of the holder arm G (G′), the only connection-securing means required being the spring device 12—15 (17—19). In the form depicted in Figs. 5, 6 and 7, the upper end of the spring 17 finds bearing support on a part of the upper end of the arm G′. Consequently, to replace an old arm it is only necessary after removing the old arm, to pass the upper end of the new arm into the hole 10′ and then hook or engage the free end of the connection-securing part or extension 18 over the shaft F′.

We claim as our invention:—

1. In a windshield cleaner, an operating member extending at an angle to the face plane of the windshield glass, a wiper moving arm pivotally connected to said operating member to swing to a position substantially at a right angle to said member and to a position alined with the axis of said member, and a coil spring mounted on said arm and surrounding a portion of said arm a distance below the pivotal connection to said member and having a part extending from the lower portion of said coil spring and bearing on said member at a point spaced from said pivotal connection for resiliently urging said arm toward the windshield glass.

2. In a windshield cleaner, an operating shaft extending at an angle to the face plane of the windshield glass, said operating shaft having a pair of spaced recesses therein, a wiper moving arm having a portion engaged in one of the recesses of said shaft for pivotally connecting said arm to said shaft to swing from a position at a substantial right angle to said shaft to a position substantially alined with the axis of said shaft, a retractile coil spring surrounding said arm and having a part engaged in the other of said recesses at a point spaced from the pivotal connection for resiliently urging said arm toward the windshield glass.

3. In a windshield cleaner, a wiper carrying arm, an actuating member therefor, one of said elements having a transverse opening and the other of said elements having a laterally bent part pivotally engaging in the transverse opening, and a spring coiled about one of said elements and having its two ends secured respectively to the arm and actuating member.

4. In a windshield cleaner, a wiper arm, an actuating shaft pivotally connected thereto, a spring coiled about the arm and bearing at one end thereon adjacent the shaft, and means connecting the opposite end of the spring to the shaft at a point spaced from the pivotal connection of said wiper arm and adapted to tension the spring during pivotal movement of the arm on the shaft.

5. In a windshield cleaner, an actuating shaft having a transverse recess, a wiper arm having one end portion formed of wire and bent laterally to engage in the recess and constitute a pivotal connection between the shaft and arm to permit the latter to swing in a direction lengthwise of the shaft, and means for releasably securing the pivotal connection.

6. In a windshield cleaner, a wiper carrying arm having a pintle part at one end, an actuating member for the arm having a bearing in which said pintle part engages for pivoting on an axis parallel to the windshield glass, said pintle part projecting from its bearing, and a spring device for securing the pintle part against displacement from its bearing, said spring device comprising a spring body coiled about the projecting portion of the pintle part and having one end coiled about said actuating member and its opposite end extending downwardly alongside of said wiper carrying arm and embracing the same to secure the arm against displacement from its bearing and to urge the arm toward the windshield glass.

7. In a windshield cleaner, a wiper carrying arm having a pintle part at one end, an actuating member for the arm having a bearing in which said pintle part engages for pivoting on an axis parallel to the windshield glass, and a dual functioning device acting to secure the pintle part against displacement from its bearing and to urge the wiper arm toward the glass, and comprising a coiled spring body mounted co-axially with said pintle part and having one end fixed and the opposite end extended downwardly along the wiper carrying arm and terminating in a hook for releasably engaging over and embracing said arm.

8. In a windshield cleaner, an actuating member having a part provided with a bearing whose axis lies in a plane parallel to the windshield glass, a wiper carrying arm having an angular extension constituting a pintle for engaging in said bearing and operating about said axis whereby said arm will swing in a plane perpendicular to the glass, and a spring-securing device mounted on the actuating member and having a part extending along said arm to a point spaced from said pintle and terminating in a seat for receiving said arm to hold it against lateral pintle-displacing movement and also to urge the arm toward the glass for creating a wiping contact.

9. In a windshield cleaner, an actuating member having a part provided with a bearing whose axis lies in a plane parallel to the windshield glass, a wiper-carrying arm having an angular extension constituting a pintle for engaging in said bearing and operating about said axis whereby said arm will swing in a plane perpendicular to the glass, and a spring-securing device having a section coiled about the pintle to be coaxial therewith, one end of the coiled section being extended alongside the arm and terminating in a seat, and said seat having a part engaging over the outer surface of the arm to urge the latter toward the glass and to prevent displacement of said pintle.

10. In a windshield cleaner, an actuating member having a part provided with a bearing whose axis lies in a plane parallel to the windshield glass, a wiper carrying arm having an angular extension constituting a pintle for engaging in said bearing and operating about said axis whereby said arm will swing in a plane perpendicular to the glass, and a spring-securing device having a mounting part adjacent said pintle and a substantially straight leg extending along said arm and terminating in an angularly related seat to receive the arm.

11. A mounting for the wiper carrying arm of windshield cleaners for maintaining a substantially uniform pressure in the wiping contact of the wiper on the windshield under varying positions of the wiper carrying arm in its angular relationship to the shaft, said mounting comprising an operating shaft, a wiper carrying arm pivotally connected to the shaft for swinging in a plane lengthwise thereof, and resilient means pivotally connected to the shaft at a point spaced from said arm pivot connection for moving with the arm as the latter swings about its pivot, said resilient means having an effective connection to the arm at a point remote from both of the pivotal connections aforesaid and acting to exert a pressure on its points of connection to the shaft and arm in a line between said points of connection whereby as the arm is moved about its pivot the angularity between such line of pressure and the line between said pivot points will be varied, and when the arm is moved in a manner to cause an increase in the pressure of said resilient means on the arm the effective leverage of said resilient means will be decreased to offset such pressure increase in its magnitude.

JOHN R. OISHEI.
HENRY HUEBER.
WILLIAM PAULUS.
ERWIN C. HORTON.